US012404720B2

(12) United States Patent
Wang et al.

(10) Patent No.: US 12,404,720 B2
(45) Date of Patent: Sep. 2, 2025

(54) ADJUSTABLE FENCING, GATES, AND ASSEMBLIES AND METHODS OF ASSEMBLY AND INSTALLATION

(71) Applicant: Jewett-Cameron Company, North Plains, OR (US)

(72) Inventors: Jackson Wang, Happy Valley, OR (US); Andrew Diggins, North Plains, OR (US)

(73) Assignee: Jewett-Cameron Company, North Plains, OR (US)

( * ) Notice: Subject to any disclaimer, the term of this patent is extended or adjusted under 35 U.S.C. 154(b) by 350 days.

(21) Appl. No.: 18/187,825

(22) Filed: Mar. 22, 2023

(65) Prior Publication Data

US 2023/0340835 A1 Oct. 26, 2023

Related U.S. Application Data

(60) Provisional application No. 63/322,266, filed on Mar. 22, 2022.

(51) Int. Cl.
*E06B 11/02* (2006.01)

(52) U.S. Cl.
CPC .................................. *E06B 11/027* (2013.01)

(58) Field of Classification Search
CPC ........ E06B 11/02; E06B 11/022; E06B 11/04; E04H 17/1426
See application file for complete search history.

(56) References Cited

U.S. PATENT DOCUMENTS

| | | | | | |
|---|---|---|---|---|---|
| 1,298,072 | A * | 3/1919 | McNabney et al. | E06B 11/02 | 256/73 |
| 3,290,014 | A * | 12/1966 | Stapleton | E06B 11/02 | 52/645 |
| 4,793,098 | A | 12/1988 | Wilkerson | | |
| 4,796,384 | A | 1/1989 | Warwick | | |
| 4,831,777 | A | 5/1989 | Johnson | | |
| 4,912,863 | A * | 4/1990 | Harvey | A47G 1/065 | 40/781 |
| 5,716,041 | A * | 2/1998 | Groves | E06B 11/02 | 49/55 |
| 5,868,382 | A * | 2/1999 | Groves | E06B 11/02 | 49/55 |
| 6,464,209 | B2 * | 10/2002 | Meis | E06B 11/02 | 256/73 |

(Continued)

*Primary Examiner* — Daniel J Wiley
(74) *Attorney, Agent, or Firm* — Nemphos Braue LLC; Michael Antone

(57) ABSTRACT

Adjustable fence and gate assemblies may include first and second vertical frame sections having opposing ends and horizontal frame sections are rotatably connected to each end of the vertical frame sections. The vertical and horizontal frame section may be adjustably connected to form an adjustable frame for the gate. Gate member brackets may be attached to each end of the vertical frame sections proximate each end of the vertical frame sections to retain and secure gate members in position. Two hinge brackets may be positioned on the vertical frame section configured to attach to a post and enable opening and closing of the gate. Truss cable connectors including a turnbuckle and a collet may be employed to secure a truss cable providing structural support for the gate and provide access to the interior of the frame sections for truss cable storage.

14 Claims, 16 Drawing Sheets

(56) References Cited

U.S. PATENT DOCUMENTS

| | | | | |
|---|---|---|---|---|
| 6,561,493 | B1 * | 5/2003 | Lackey, Jr. | E06B 11/02 256/65.01 |
| 7,114,706 | B1 * | 10/2006 | Bemis | E06B 11/02 256/65.01 |
| 7,895,713 | B2 * | 3/2011 | Williams, Jr. | E05D 5/06 16/389 |
| 8,596,619 | B2 | 12/2013 | Volin | |
| 8,650,741 | B1 | 2/2014 | Piper et al. | |
| 9,512,674 | B2 * | 12/2016 | Keudell | E06B 11/02 |
| 9,784,031 | B2 | 10/2017 | Volin | |
| 10,030,445 | B2 | 7/2018 | Callahan et al. | |
| 10,697,236 | B2 * | 6/2020 | King | E05D 7/02 |
| 10,947,782 | B2 * | 3/2021 | Wright | E06B 11/02 |
| 11,066,874 | B1 * | 7/2021 | Penner | E06B 11/027 |
| 11,629,553 | B2 * | 4/2023 | Morton, III | E06B 9/04 49/394 |
| 2003/0217515 | A1 * | 11/2003 | Boroviak | E06B 3/984 49/501 |
| 2004/0067101 | A1 * | 4/2004 | Gross | E06B 3/984 403/403 |
| 2005/0063770 | A1 * | 3/2005 | Gross | E06B 11/02 403/205 |
| 2009/0315009 | A1 * | 12/2009 | Walker | E06B 3/9687 256/73 |
| 2010/0237310 | A1 * | 9/2010 | Boroviak | E06B 11/02 256/73 |
| 2013/0175480 | A1 | 7/2013 | Volin | |
| 2016/0108668 | A1 * | 4/2016 | Volin | E06B 7/14 256/73 |
| 2016/0251897 | A1 | 9/2016 | Keudell | |
| 2016/0362934 | A1 * | 12/2016 | Swafford | E05D 3/02 |
| 2016/0376822 | A1 * | 12/2016 | Volin | E06B 11/022 49/396 |
| 2017/0218692 | A1 * | 8/2017 | Swafford | E06B 11/085 |
| 2019/0338588 | A1 * | 11/2019 | King | E05D 7/1044 |

* cited by examiner

FIG. 9B
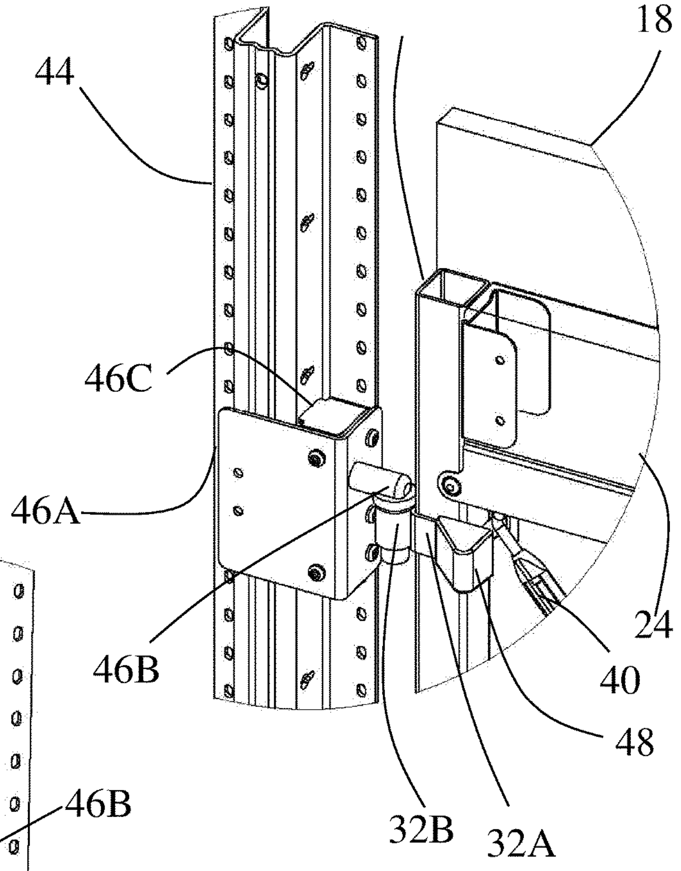
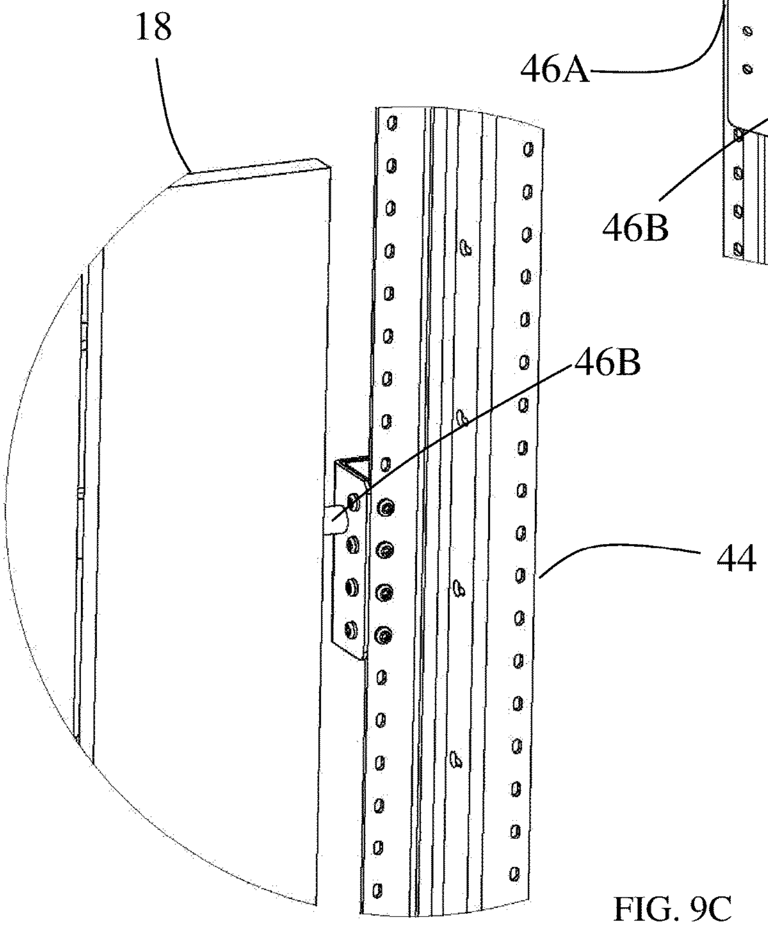
FIG. 9C

FIG. 12A
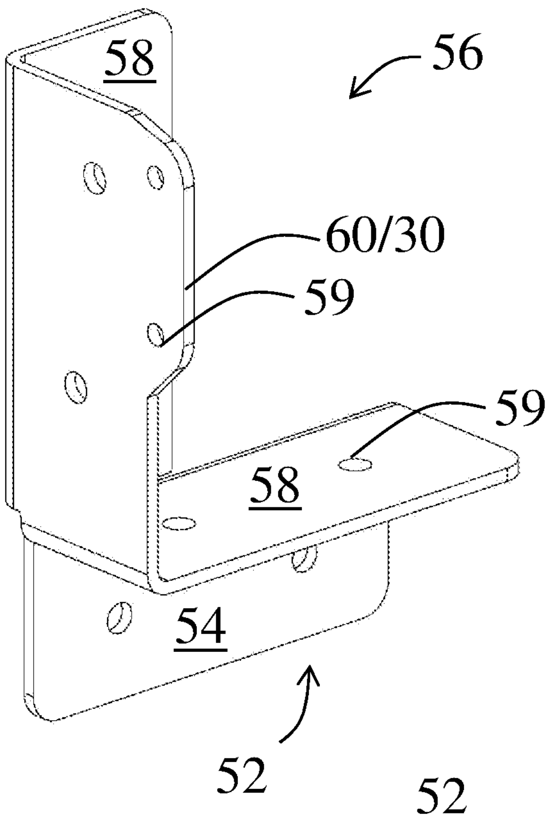
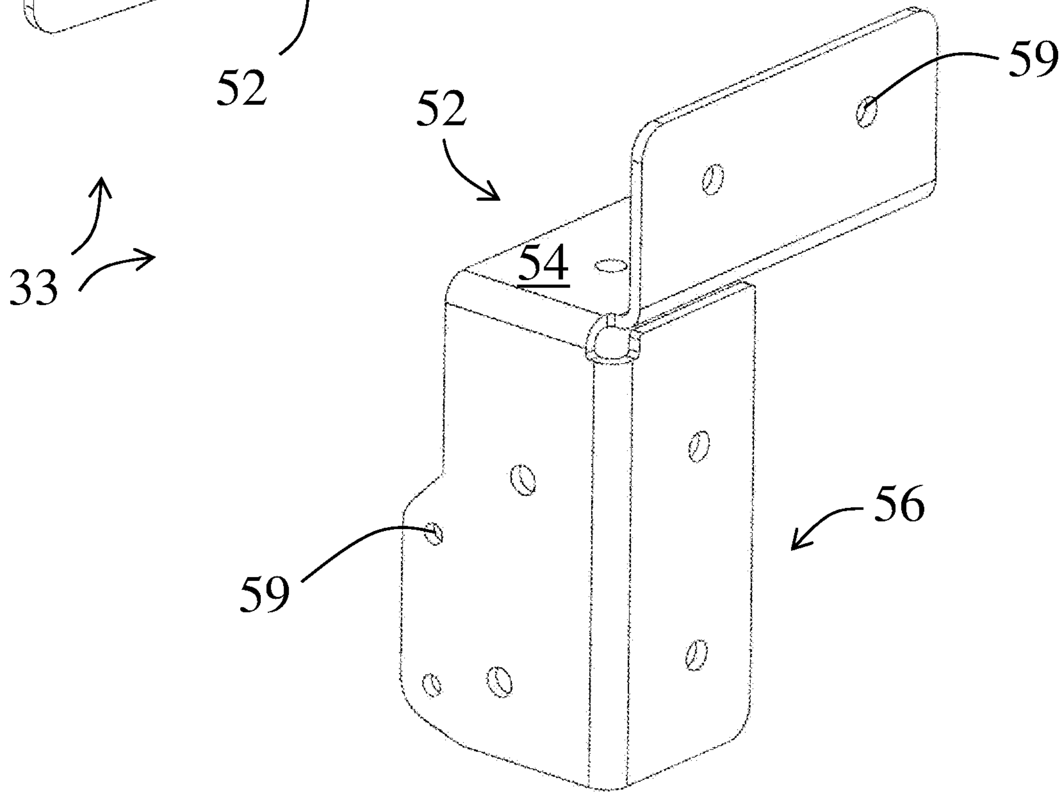
FIG. 12B

FIG. 14A
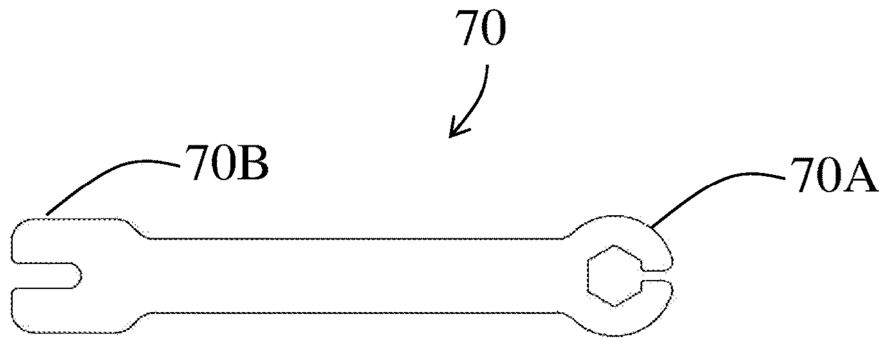
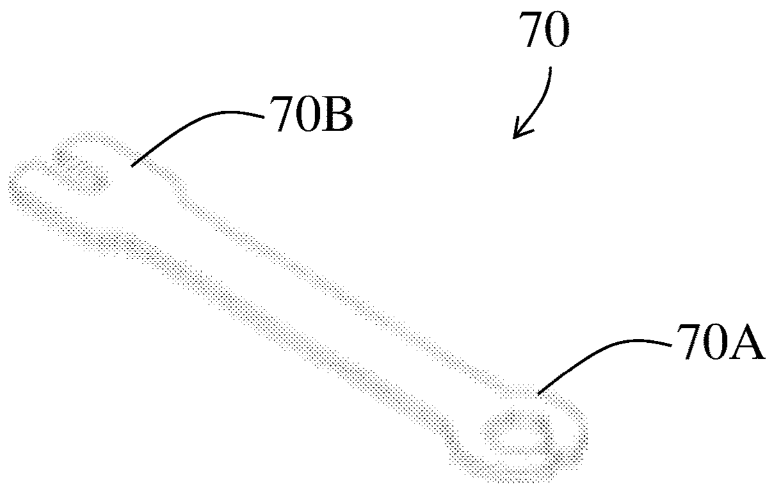
FIG. 14B

ADJUSTABLE FENCING, GATES, AND ASSEMBLIES AND METHODS OF ASSEMBLY AND INSTALLATION

STATEMENT REGARDING FEDERALLY SPONSORED RESEARCH OR DEVELOPMENT

Not Applicable

CROSS-REFERENCE TO RELATED APPLICATIONS

This application claims priority to and the benefit of U.S. Provisional Patent Application No. 63/322,266 filed on 2022 Mar. 22, the disclosure of which being incorporated by reference in its entireties.

BACKGROUND OF THE INVENTION

Field of the Invention

The present invention generally relates to fencing. More specifically, the invention relates to adjustable fence sections, gates, and gate assemblies, and fence gates in particular.

Background

Fences are deployed throughout the world to enclose spaces of various sizes and shapes. The versatility of fencing presents a challenge to the installer, namely, it may be difficult to ascertain the precise size of gates that are to be installed to provide access to and from the enclosed space until the installation is performed.

The applicant and others have provided various solutions to this challenge through the use of adjustable width gates. Examples of such solutions are described in U.S. Pat. Nos. 5,716,041, 8,596,619, and 9,784,031, which are incorporated herein by reference.

The use of fencing continues to increase with the continued advancement of fencing manufacturing and installation technology. As such, there is a continuing need for adjustable gates that can be manufactured, delivered and installed with lower cost and provide higher performance.

BRIEF SUMMARY OF THE INVENTION

The present invention addresses the above noted continuing needs by providing adjustable fence sections and gates that are more easily manufactured, delivered, and installed. In various embodiments, fence sections and gates may include vertical and horizontal frame sections configured to enable an installer to adjust the horizontal dimension of the gate by adjusting the frame sections. In addition, the vertical and horizontal sections may be connected and adjustable to facilitate ease of shipping and handling by installers. For example, the horizontal frame sections may be U-shaped or I-shaped and sized along with the vertical frame sections such that the horizontal frame sections may be rotated to be generally parallel to the vertical frame sections and may capture a portion of the vertical frame sections. The rotatable connection of the vertical and horizontal frame sections reduces the shipping footprint of the frame sections and reduces assembly time for the installer.

In various embodiments, adjustable truss cable connections and cable storage may be provided to prevent injury from loose ends of cables and to allow resizing and adjusting of the gate as may be desired. One or more truss cables may be fixed or detachable from truss cable connectors on opposing sides of the gate to provide support for the gate during operation and for leveling or otherwise adjusting the gate during and after installation. Embodiments may include one or more turnbuckles or other tension adjusters to enable tension adjustment of an installed truss cable.

In various embodiments, a collet assembly is provided in one of the frame sections to attach one end of the truss cable. The frame section may include an opening to allow the end of the truss cable to be inserted through the opening, thereby enabling an installer to store any additional length of truss cable not needed for the particular gate configuration. Cable storage improves installer and user safety and eliminates the need for an installer to cut the truss cable to a specific size, thereby enabling the gate to be resized or redeployed at a later time without having to cut the existing truss cable or buy and install a new truss cable.

Gates of present invention may also include cooperating hinges to enable a greater range of motion for the gate. The hinges may also include bumpers to prevent damage to the gate and surrounding structures.

In various embodiments, adjustable gate assemblies may include hinge and latch brackets for use by the installer with vertical and horizontal members of various lengths. The hinge and latch brackets may further include member receiving portions and truss cable connectors to enable the connection of one or more truss cables for installations using truss cables to enable installers to customize the finished gates including both dimensions and the type of fencing.

Accordingly, the present disclosure addresses the continuing need for adjustable fence sections and gates with improved cost and performance.

BRIEF DESCRIPTION OF THE DRAWINGS

The accompanying drawings are included for the purpose of exemplary illustration of various aspects of the present invention, and not for purposes of limiting the invention, wherein:

FIGS. 9B-9C show close-up back and front views, respectively, of the hinge bracket and bumper of gate and post shown in FIG. 9A in the closed position.

FIGS. 12A-12B show perspective views of exemplary latch brackets.

FIGS. 14A & 14B depict top or bottom plan and perspective views a truss bracket adjustment tool.

Figure 1A:
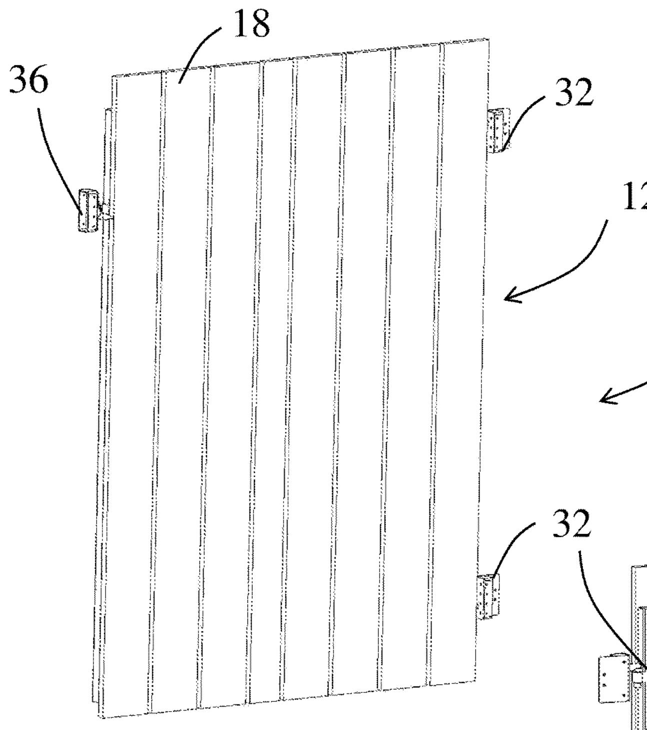
FIGS. 1A & 1B show perspective front and back views of exemplary gate embodiments with exemplary fencing.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Fence sections, gates, and assemblies 10 of the present invention may be employed in various configurations, shapes, and sizes in the context of the present invention. To facilitate ease of reading this application, fence sections, gates, and gate assemblies 10 may be referred to collectively as "gates" with the exception of those functions and features associated solely with a gate.

Figure 1B:
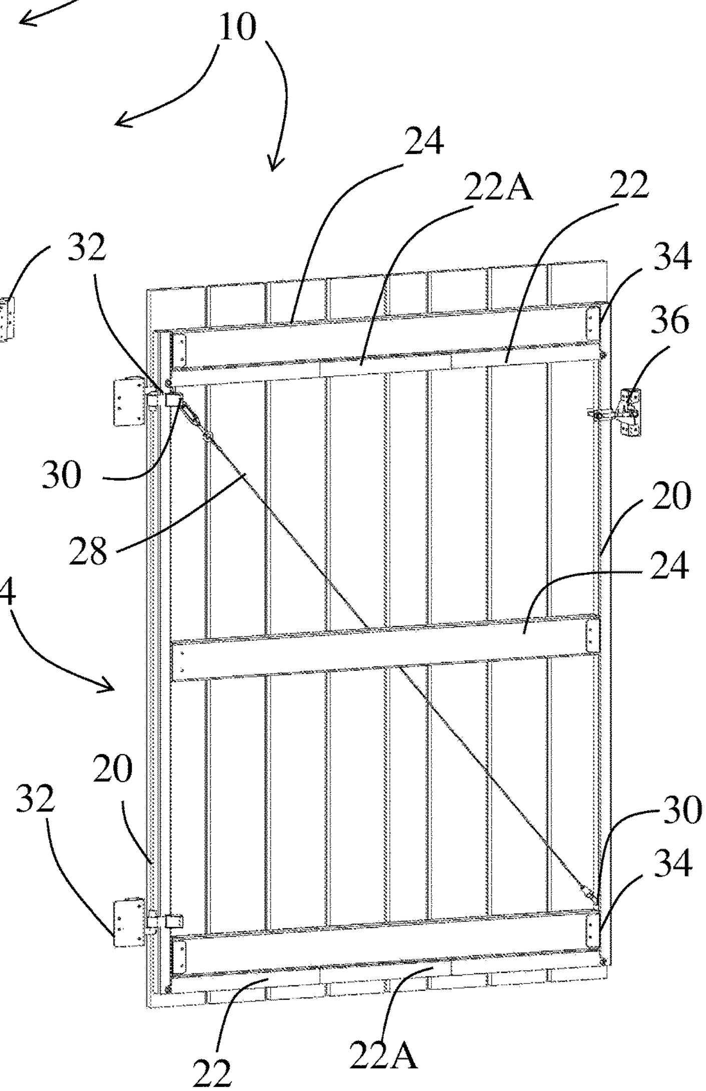

FIGS. 1A & 1B show perspective front and back views of exemplary gates 10. The gates 10 may include front 12 and back 14 sides, gate structure 16, and fencing 18. The gate structure 16 may include vertical and horizontal frame sections, 20 and 22, horizontal and vertical members, 24 and 26, one or more truss cables 28 and corresponding truss cable connectors 30, one or more hinge brackets 32, one or more latch brackets 33, one or more member brackets 34. The gate 10 may also include a latch 36.

Figures 2A, 2B:
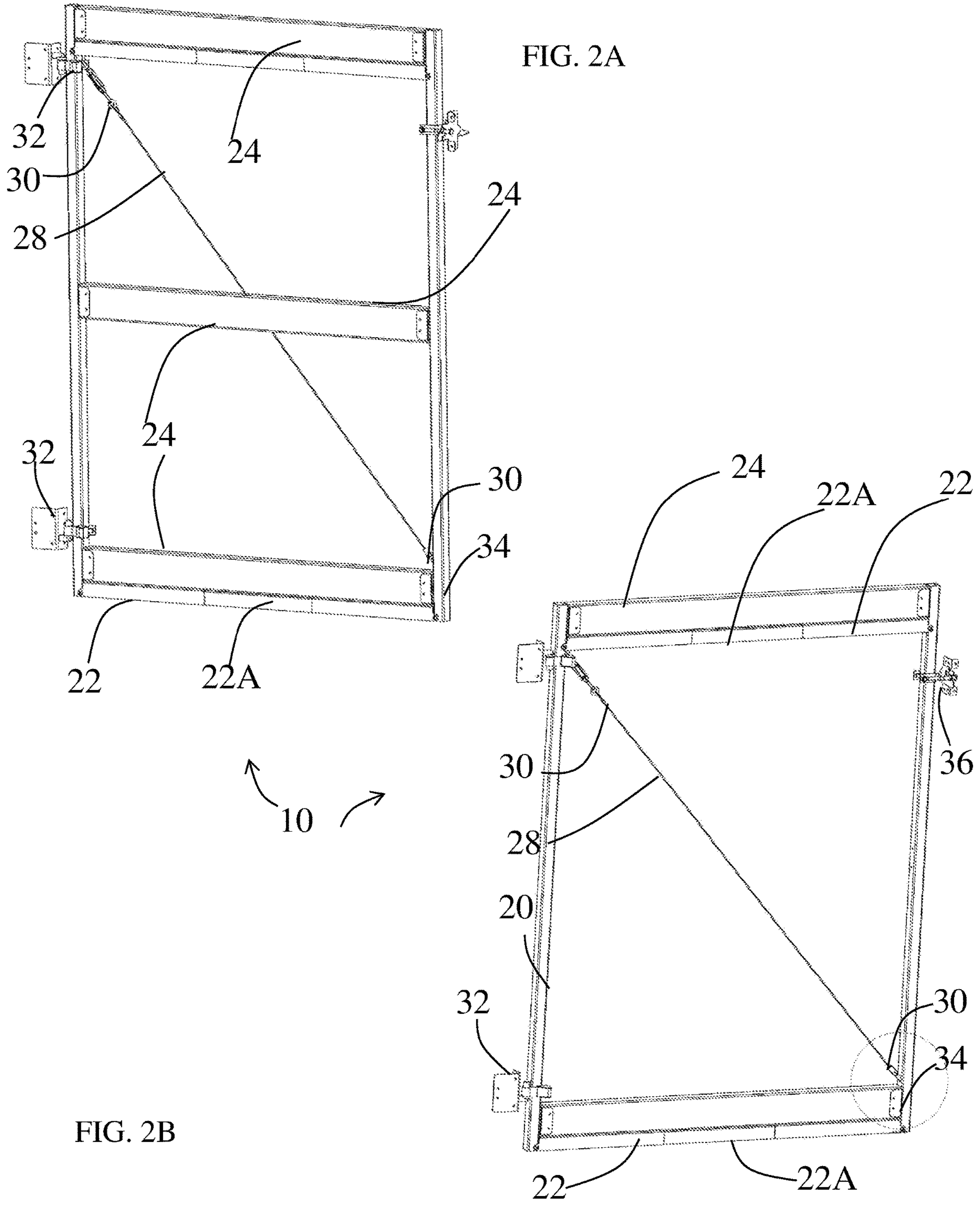
FIGS. 2A & 2B show perspective front and back views of exemplary gate embodiments without exemplary fencing.

FIGS. 2A & 2B show perspective front and back views of exemplary gate embodiments without exemplary fencing. FIG. 2A embodiments include at least one middle horizontal members 24, while FIG. 2B embodiments only include two horizontal members 24. One of skill in the art will appreciate that the number of horizontal members 24 can be varied by the skilled artisan to achieve various levels of structural support and aesthetics for the gate 10.

In addition, the length of the horizontal members 24 may be decided by the installer to fit an opening in the fence at the time of installation. In application, the horizontal members 24 may be sold as part of a gate assembly or purchased separately from the gate assembly 10. In addition, one of skill in the art will appreciate that vertical members 26 and diagonal members may be used by the skilled artisan to provide structural support and/or for ornamentation.

As shown in FIGS. 1A-3A, the gate 10 may include middle horizontal frame sections 22A that movably cooperate with horizontal frame sections 22 that are attached to the vertical frame sections 20 to enable the horizontal frame section to be varied in length to suit a particular application.

As is known of skill in the art, the various components of the gate 10 may be comprised of different types of materials, e.g., metals, wood, plastic, etc., depending upon the particular application of the gate 10. For example, the frame sections 20 and 22, truss cable 28, truss cable connectors 30, brackets 32, 33, and 34, and latch 36 will typically be made of steel or other high strength material. The fencing 18 and horizontal members 24 may constructed from wood, plastic, metal, or combination thereof.

In various embodiments, adjustable truss cable connections and cable storage may be provided to prevent injury from loose ends of cables and to allow resizing and adjusting of the gate as may be desired. One or more truss cables 28 may be fixed or detachable from the truss cable connectors 30 on opposing sides of the gate 10, e.g., frame sections 20 and/or 22, members 24 and/or 26, etc., to provide support for the gate 10 during operation and for leveling or otherwise adjusting the gate 10 during and after installation, for example, if sagging occurs through use, settling, etc. The one or more truss cables 28 may extend diagonally, horizontally, and/or vertically between the frame sections 20/22 or members 24. Embodiments may include one or tension adjusters at one or both ends of the truss cable 28 to enable tension adjustment of an installed truss cable 28, which may be part of the truss cable connector 30 or a separate component.

Figure 3:
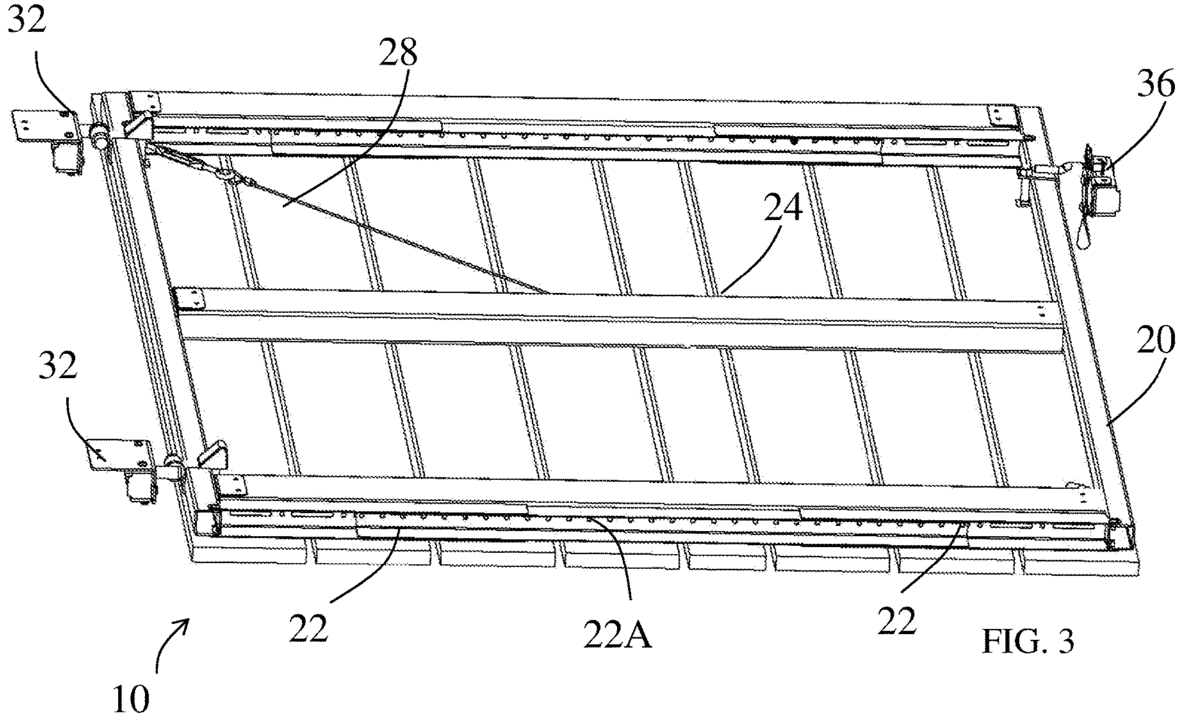
FIG. 3 shows bottom perspective back view of exemplary gate embodiments without exemplary fencing.
Figure 4:
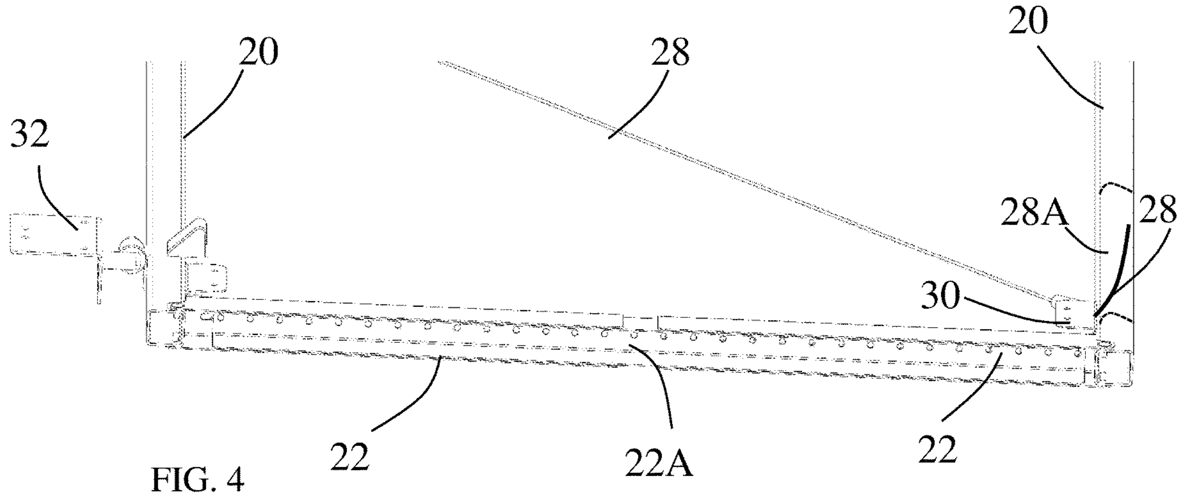
FIG. 4 shows bottom perspective view of a bottom section of exemplary gate embodiments without exemplary fencing.

FIG. 3 shows bottom perspective back view of exemplary gate embodiments with exemplary fencing. FIG. 4 shows bottom perspective view of a bottom section of gate embodiments 10 without exemplary fencing 18. In these embodiments, the horizontal frame sections 22 may be U-shaped beams including a plurality of holes to support expansion of the horizontal dimension of the gate 10 and connection of the middle horizontal frame sections 22A to the end horizontal frame sections 22. In FIG. 3 embodiments, the truss cable 28 may be connected to a horizontal member 24 rather than to the vertical and horizontal frame sections 20 and 22.

FIG. 4 also depicts various embodiments that may employ adjustable truss cable connections and cable storage 28A may be provided to prevent injury from loose ends of cables and to allow resizing and adjusting of the gate as may be desired. FIG. 4 depicts a cut-away of the vertical frame section showing the cable storage area inside vertical frame section including a length of cable 28.

Figure 5B:
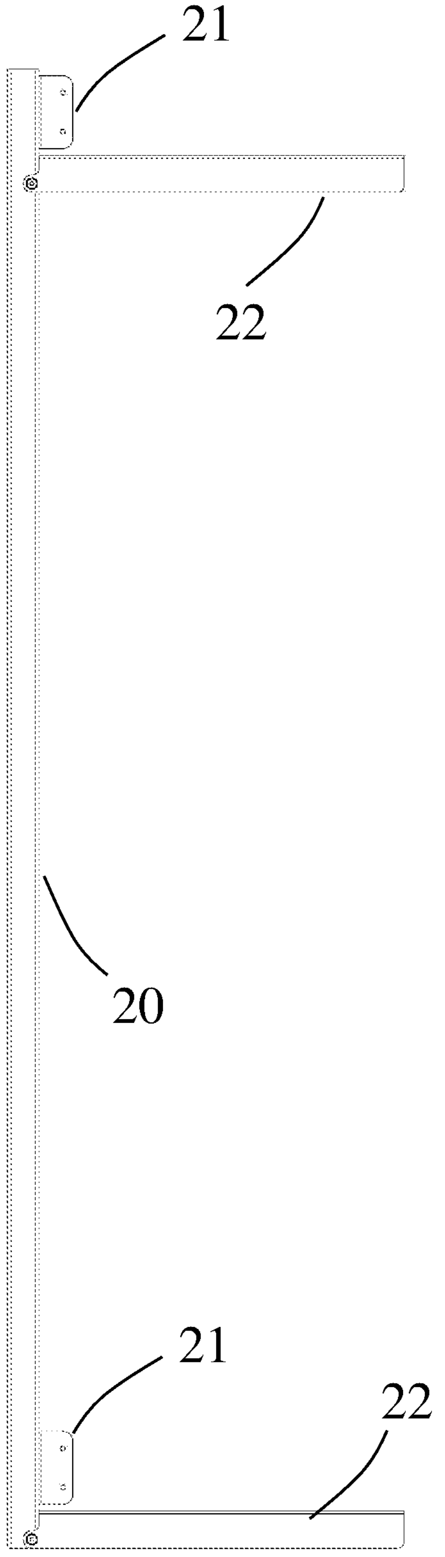
FIGS. 5A & 5B show plan views of exemplary vertical and horizontal frame section embodiments.
Figure 5A:
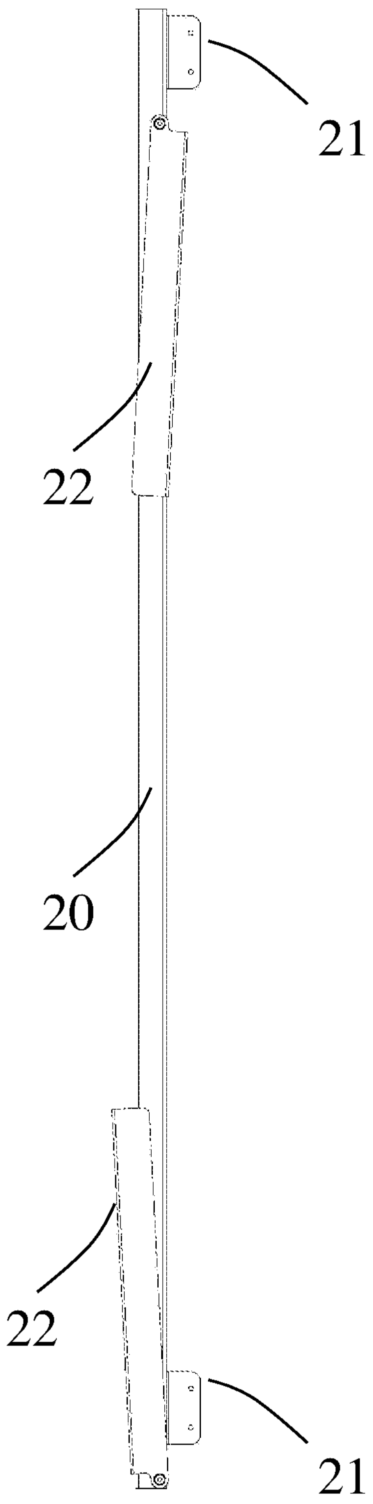

FIGS. 5A & 5B show plan views of exemplary vertical and horizontal frame section embodiments, 20 and 22. In various embodiments, the vertical and horizontal frame sections may be rotatably connected to allow the horizontal frame section to be rotated from a substantially parallel position to support shipping and handling (FIG. 5A) to substantially perpendicular position relative to the vertical frame section for installation and use (FIG. 5B). In various embodiments, the vertical frame section 20 may include an integral or separate bracket 21 allow for attachment of the members 24 to the vertical frame section 20.

Figure 6B:
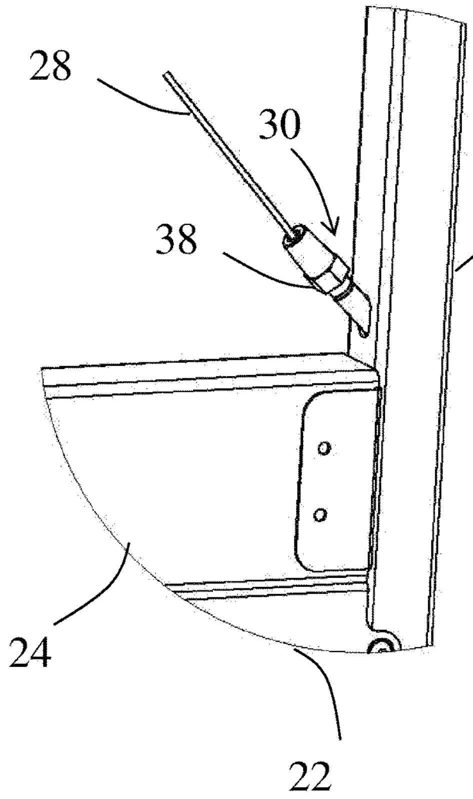
FIGS. 6A-6C show perspective views of exemplary truss cable connector embodiments.
Figure 6A:
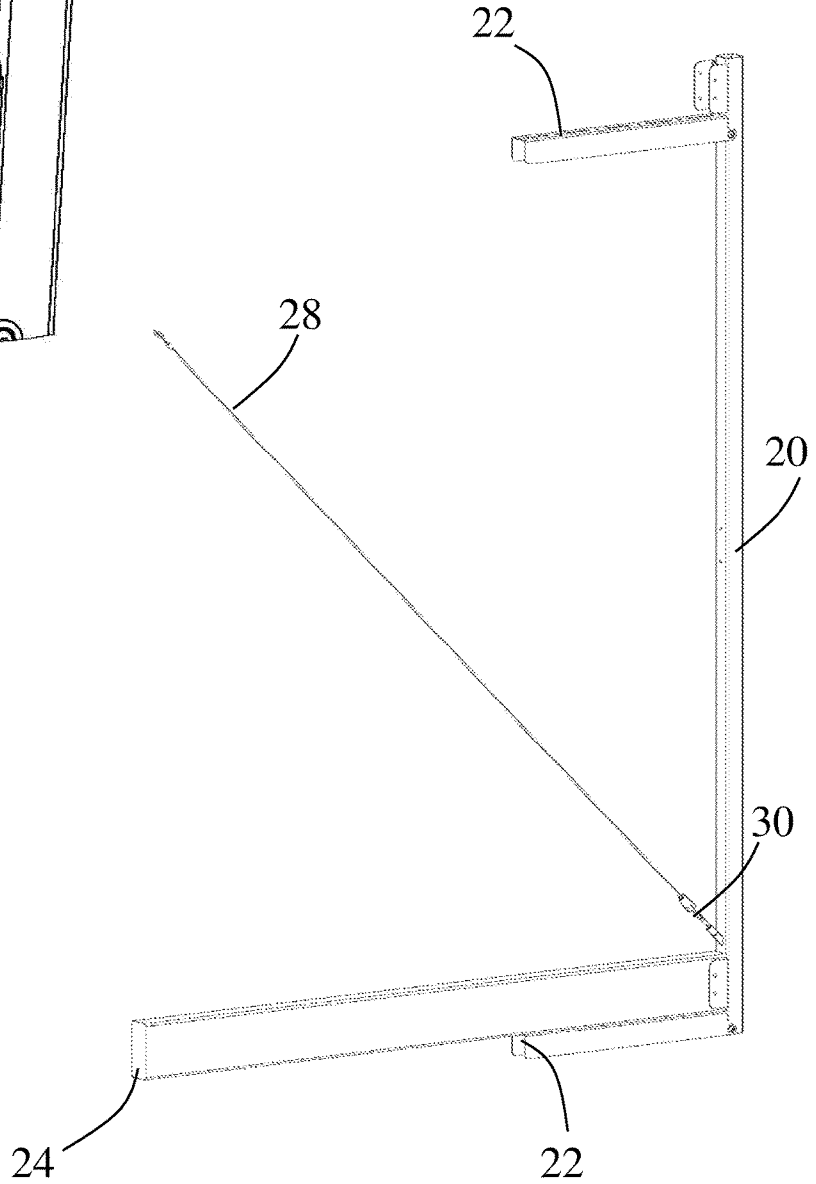
Figure 6C:
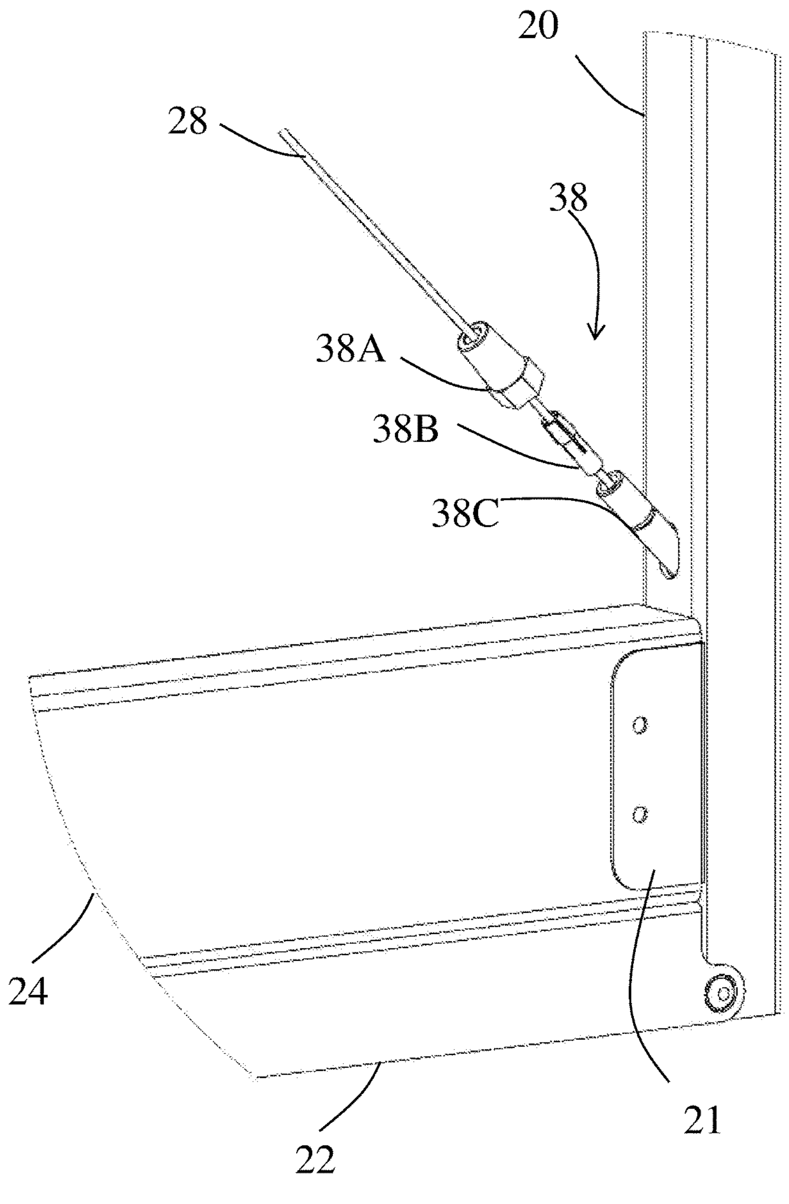

FIGS. 6A-6C show perspective views of exemplary truss cable connector embodiments 30. FIG. 6A shows a perspective view of a portion of the gate 10 with one end of the cable truss 28 and cable connector 30 embodied as a collet 38. FIG. 6B shows a close-up of the collet 38 connecting the truss cable 28 to the vertical frame section 20. The collet 38 may serve as a tension adjuster and a means for truss cable storage 28A. While the connector 30 is shown in these embodiments as connected to the vertical frame section 20, it may alternatively connected to the horizontal frame section 22.

FIG. 6C depicts a close-up perspective view of the collet 38 including collet cap 38A, collet 38B, and receiving section 38C. In various embodiments, receiving section 38C provides access to the interior of the vertical or horizontal frame section 20 and 22, to allow excess truss cable 28 to be inserted and stored inside the frame section in the cable storage area 28A as shown in FIG. 4 embodiments for possible later use during adjustments, resizing, repairs, etc.

Figure 7:
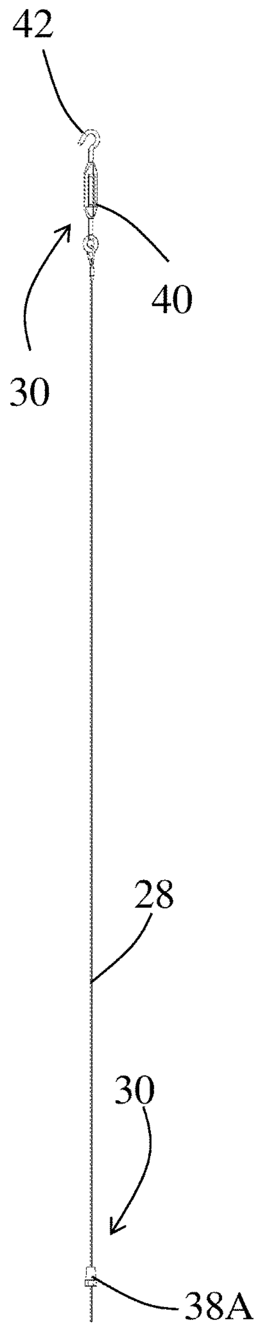
FIG. 7 shows a plan view of exemplary truss cable.

FIG. 7 shows a plan view of exemplary truss cable 28 that may be used with various embodiments of the gate 10. At one end of the truss cable 28, the connector 30 is embodied as a collet assembly 38 with collet cap 38A showing. The connector 30 at the other end embodied as a turnbuckle 40 and hook 42. In the depicted embodiment, the hook 42 is shown as an open-ended hook to allow the truss cable 28 to be easily disconnected from the gate 10. One of skill will appreciate that a hook may be provided on the frame sections 20 or 22 coupling to a closed end connector on the truss cable 28.

Figure 8A:
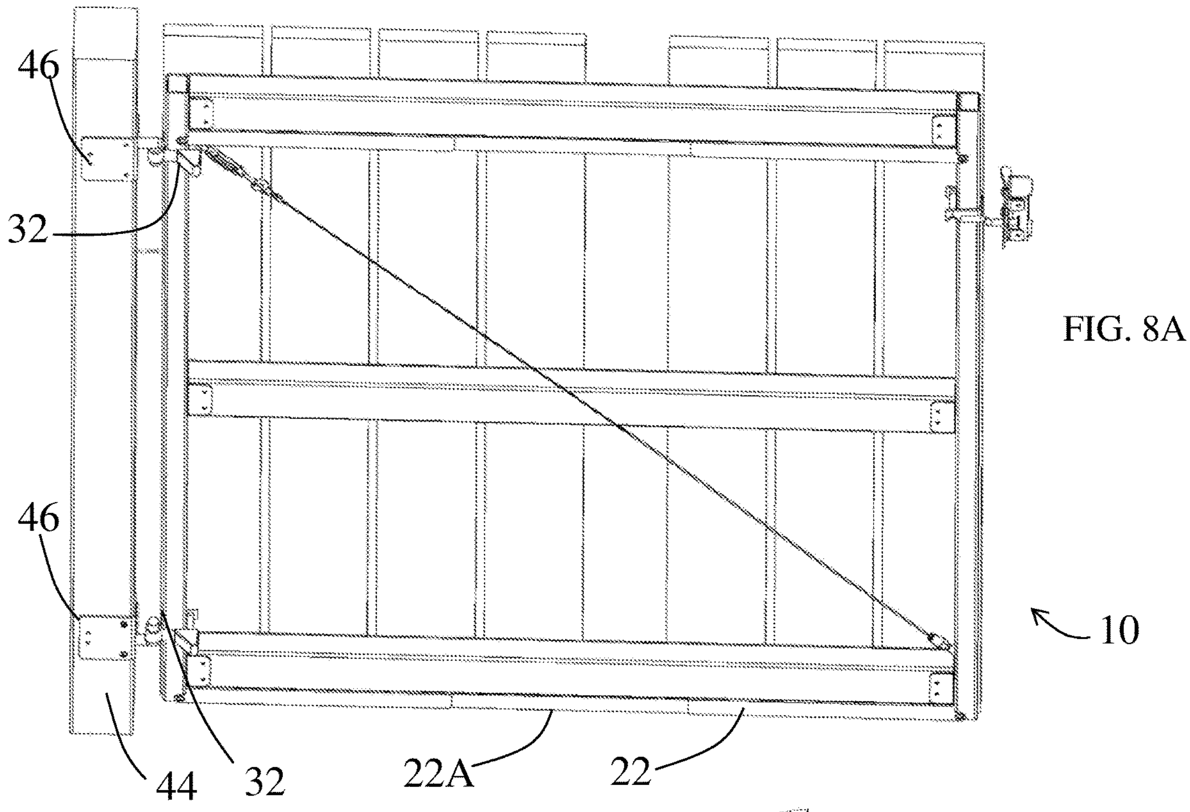
FIG. 8A shows a perspective back view of exemplary gate embodiments with exemplary fencing in the closed position.
Figure 8B:
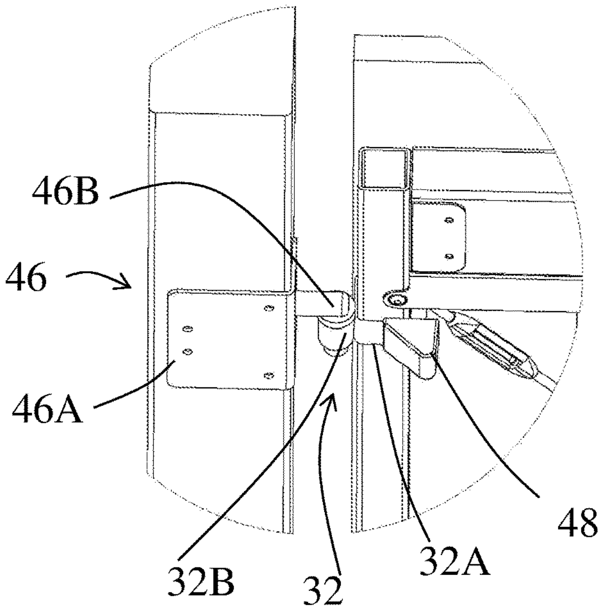
FIG. 8B shows a close-up view of the post hinge bracket and the hinge bracket of FIG. 8A in the closed position.
Figure 8C:
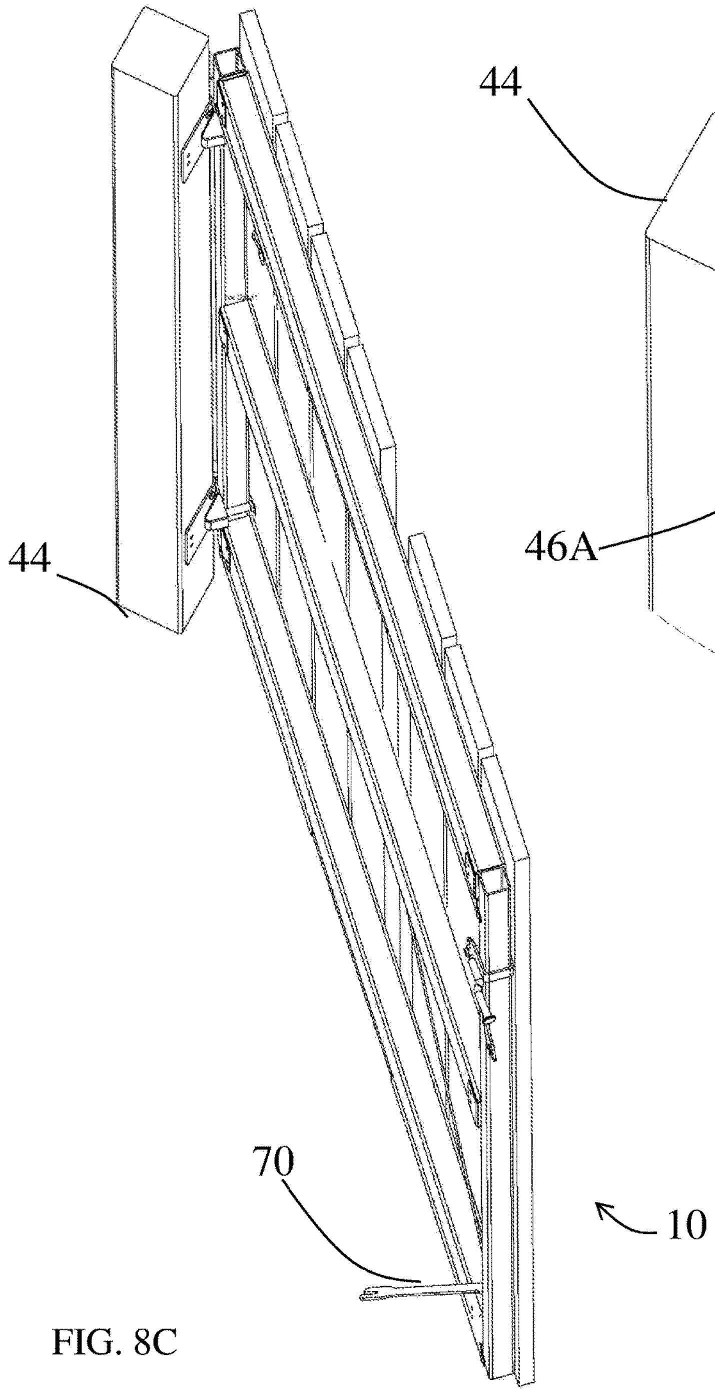
FIG. 8C shows a perspective back view of exemplary gate embodiments with exemplary fencing in the open position.

FIGS. 8A and 8C show a back and perspective back views of exemplary gate embodiments 10 with exemplary fencing in the closed and open positions, respectively, and attached to a fence post 44 with a post hinge bracket 46 that cooperates with the hinge bracket 32 to connect the gate 10 to the post 44 and allow the gate 10 to swing open and closed around a hinge axis formed by the connection of the post hinge bracket 46 and the hinge bracket 32.

Figure 8D:
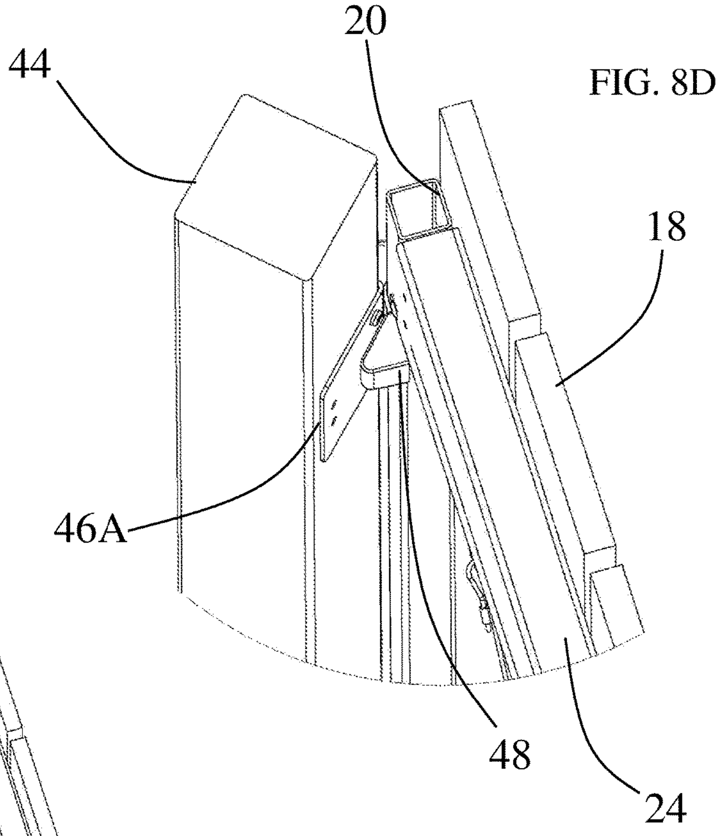
FIG. 8D shows a close-up view of the post hinge bracket and the hinge bracket of FIG. 8C in the open position.

FIGS. 8B and 8D shows a close-up view of the post hinge bracket 46 and the hinge bracket 32 of FIG. 8A in the closed and open positions, respectively. The post hinge bracket 46 includes a post hinge connector 46A that is fastened to the post 44 on one or two faces of the post 44 and a post hinge post 46B that is received by and passes through a hinge bracket slot 32B on hinge bracket 32 which may be fastened to or integral with the vertical frame section 20 by hinge bracket connector 32A. It will be appreciated by the skilled artisan that the post 46A and slot 32A on post hinge bracket 46 and hinge bracket 32 may be interchanged as desired or may be replaced by another rotational connection mechanism that fastens the gate 10 to the post 44 and allows the gate 10 to be opened and closed. The post hinge connector 46A and hinge bracket connector 32A may be provided with a plurality of holes and fasteners, e.g., screws, to enable the brackets to be connected to various post designs and applications.

The hinge bracket 32 may also include one or more bumpers 48 to limit the rotation of the gate 10 relative to the post to prevent damage to the gate 10, post 44, or surrounding structures due to over-rotation of the gate 10. The bumper 48 may be formed from a hard rubber or other material that provides a cushioning effect, which also should be able to withstand years of environmental exposure.

Figure 9A:
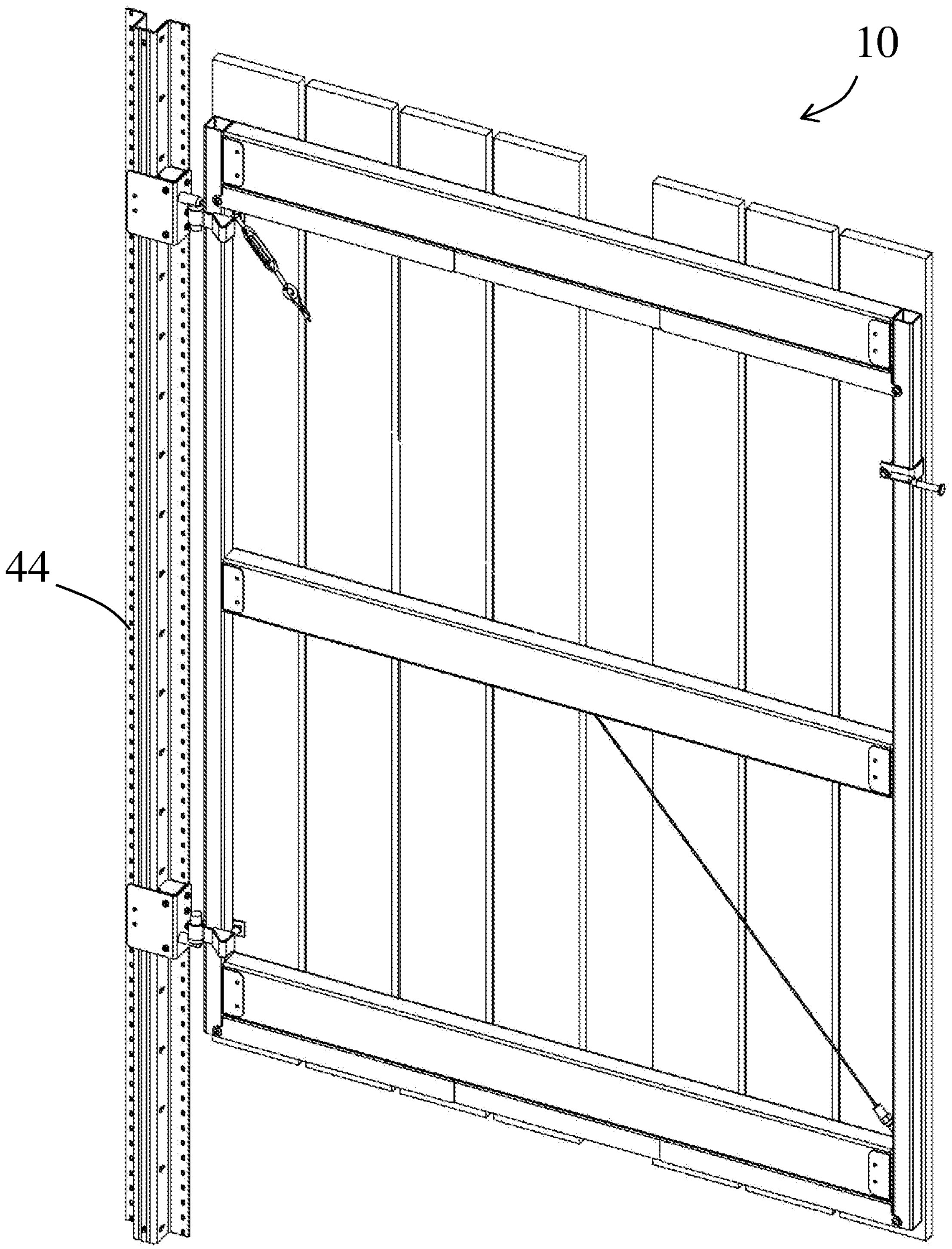
FIG. 9A shows a perspective back view of exemplary gate embodiments with exemplary fencing attached to a U-shaped post.

FIG. 9A shows a perspective back view of exemplary gate embodiments 10 with exemplary fencing 18 attached to a U-shaped post 44. For installations on post 44, such as U-shaped posts, that do not provide two faces with an outward corner, the post hinge bracket 44 may include a post hinge adapter 46C that is shaped to mount to the post 44 and provide to two faces and an outward corner for mounting the post hinge bracket 46.

FIGS. 9B-9C show close-up back and front views, respectively, of the post hinge bracket 46 and hinge bracket 32 with the post hinge adapter 46C position to allow the post hinge bracket 46 to be mounted to the post 44 from one or both face of the post hinge connector bumper 48 of gate and post shown in FIG. 9A in the closed position. In the depicted implementation, the post hinge adapter 46C has a square cross-section to enable mounting of the post hinge bracket in through two faces.

Figure 10A:
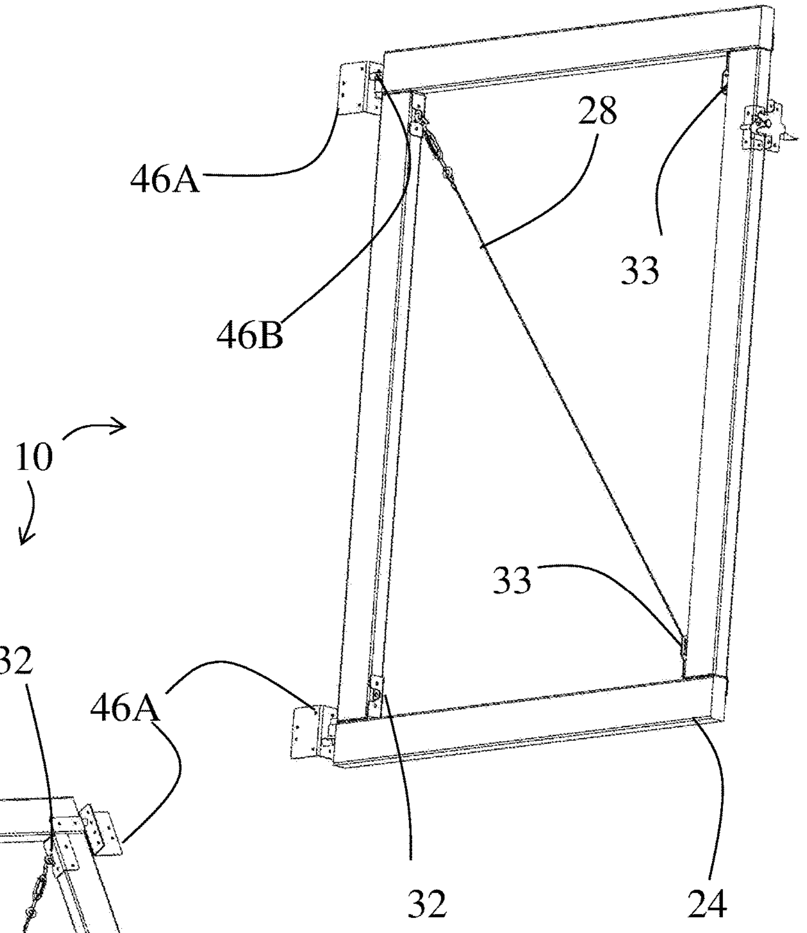
FIGS. 10A-10C show perspective views of exemplary gate embodiments without exemplary fencing.
Figure 10B:
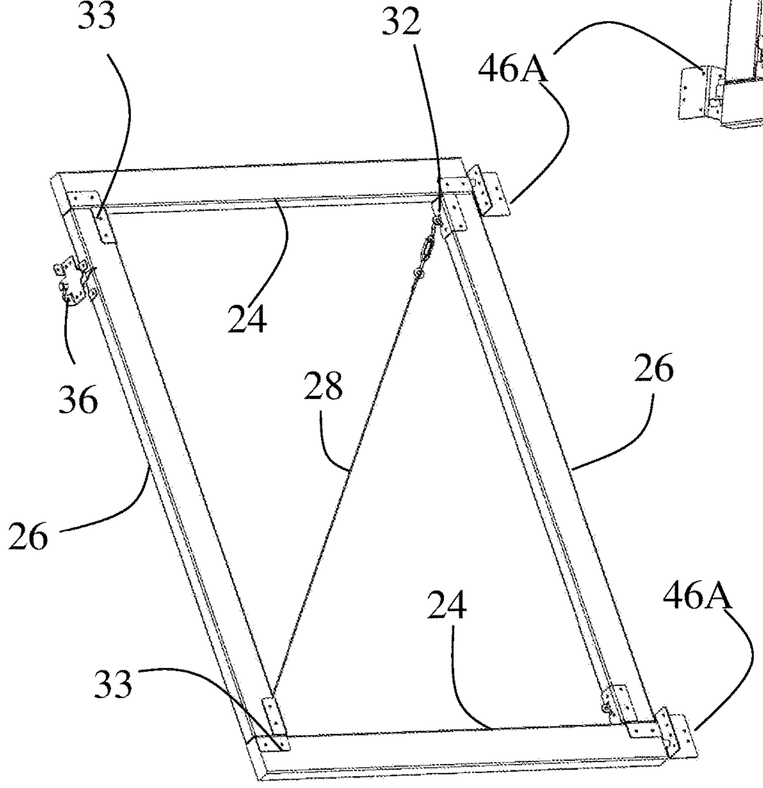
Figure 10C:
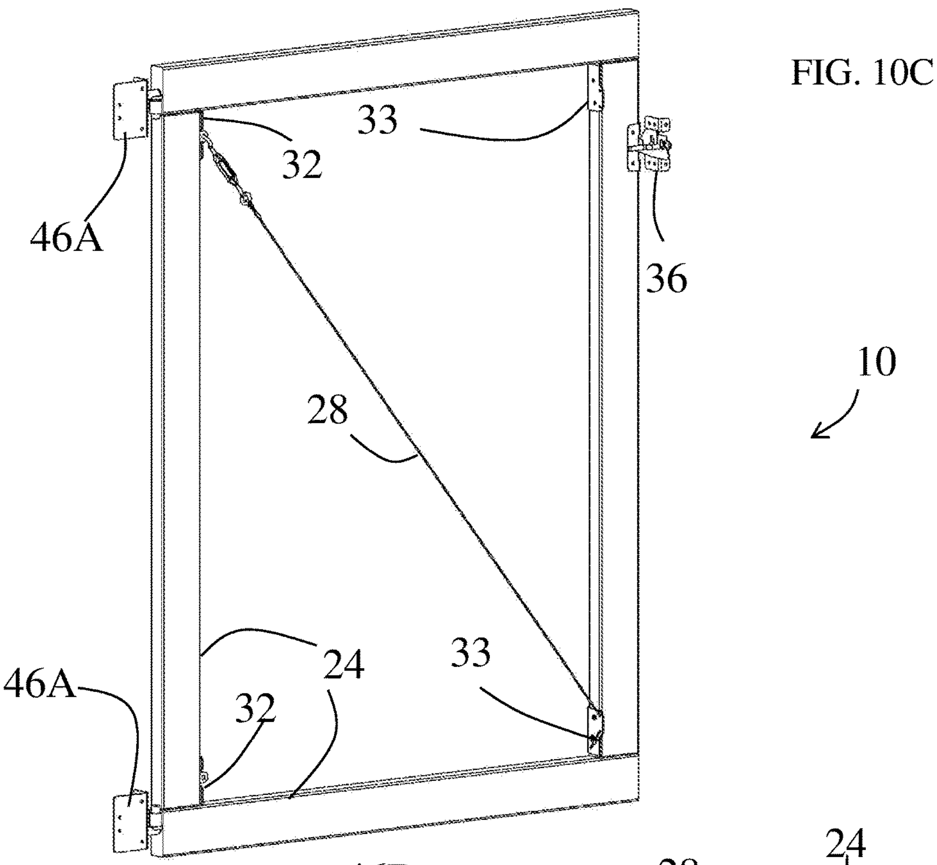
Figure 10D:
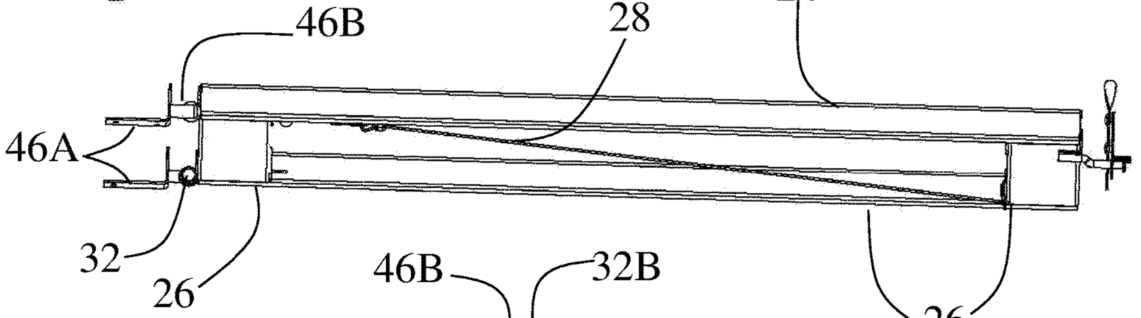
FIGS. 10D-10E show top near vertical perspective views of exemplary gate embodiments shown in FIGS. 10A-10C.
Figure 10E:
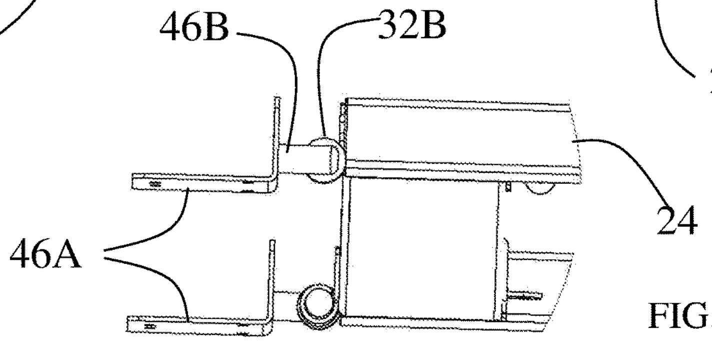

FIGS. 10A-10C show perspective views of other exemplary gate embodiments 10 without exemplary fencing 18. FIGS. 10D-10E show top near vertical perspective views of exemplary gate embodiments shown in FIGS. 10A-10C.

In embodiments, such as those depicted in FIGS. 10A-10E, there is no separate framework. Instead, the embodiments employ inventive brackets 32 and 33 as a bracketing system, such that the horizontal and vertical members 24 and 26 are used as the structural support and frame of the gate 10. In addition, the inventive brackets also integrate a portion of the truss cable connector 30 to enable the truss cable 28 to be connected via connector 30 directly to the inventive brackets 32 and 33.

FIGS. 10A-10E embodiments enable the manufacturing and shipping of the gate assembly 10 to include the brackets 32/46 and 33 and the truss cable assembly, which includes portion of the connector 30, to connect the truss cable between the brackets 32 and 33. The brackets 32 and 33, truss cable 28, and connector 30 can be sized by a manufacturer for various applications. One of skill in the art will appreciate that a manufactured gate assembly 10 shipped and sold to user may or may not include member 24 depending upon the market being served, construction materials, etc. It will be appreciated that the latch 36, truss cable 28, connector 30, post hinge bracket 46 in FIGS. 10A-10E may be the same as those used in other embodiments described herein or may be different.

Figure 11A:
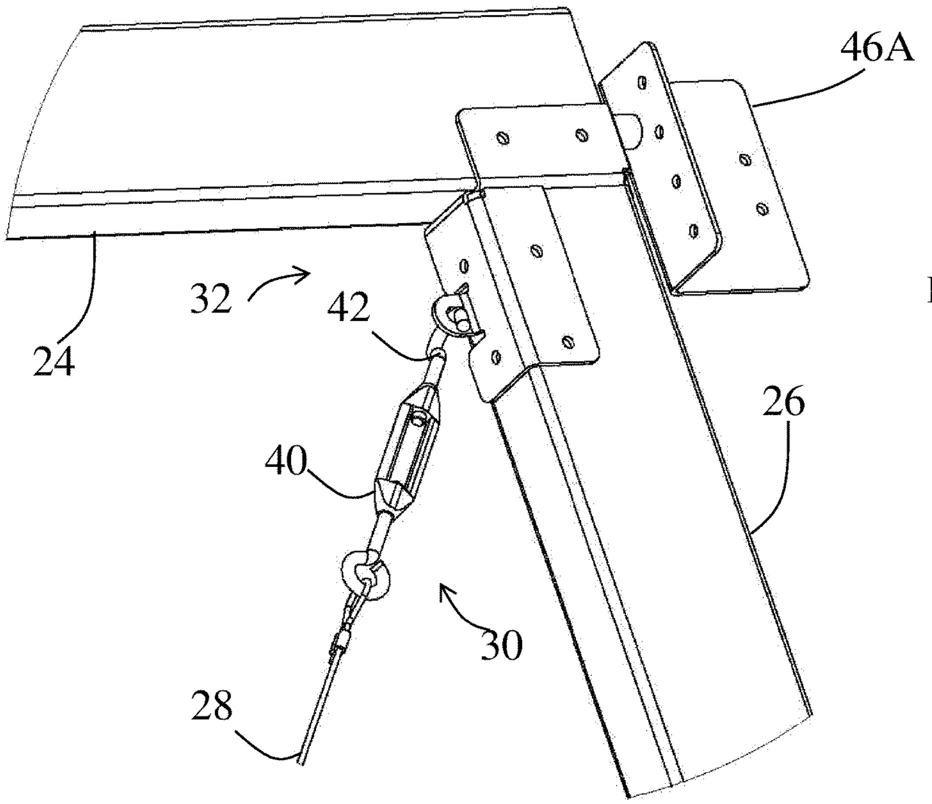
FIGS. 11A-11B show close-up views of the hinge and latch brackets, respectively, mounted on members.
Figure 11B:
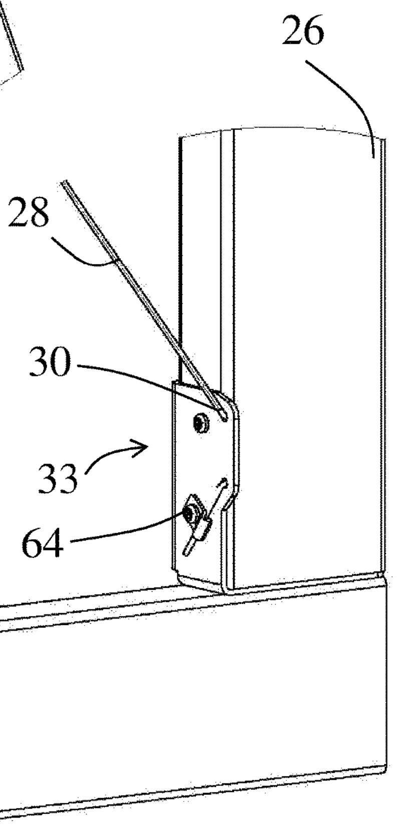

FIGS. 11A-11B show close-up views of the hinge and latch brackets 32 and 33 mounted on vertical members of the gate 10 embodiments as depicted in FIGS. 10A-10E. As noted above, the hinge and latch brackets 32 and 33 may include a portion of the truss cable connector 30 to support direct attachment of the truss cable 28 to the brackets 32 and 33. For example, one of a first truss cable connector and second a truss cable connector 30 may include a first opening in the corresponding latch and hinge bracket through the fastener 42, such as a hook, attached to the truss cable 28 attaches and the other of the first truss cable connector and second truss cable connector 30 includes at least a second opening and truss cable retainer 64 to retain the truss cable 28. The skilled artisan will appreciate that the many variants of cable connectors with the brackets are possible, e.g., connectors 30 on the brackets 32 and 33 may be swapped, the brackets may be provided as mirror images of the view depicted as desired, some hinge and latch brackets may not include truss cable connectors, and the truss connectors of different designs may be provided on different bracket locations.

FIGS. 12A-12B and 13A-13B depict perspective views of exemplary latch brackets 33 and hinge brackets 32. The brackets 32 and 33 may include a horizontal member attachment portion 52 including one or more surfaces 54 to receive and secure a portion of the horizontal member 24 and vertical member attachment portion 56 including one or more surfaces 58 to receive and secure a portion of the vertical member 26. The members 24 and 26 may be attached to the brackets 32 and 33 as is known by those skilled in the art, screws, glues, clamps, etc. and combinations thereof. For example, the brackets 32 and 33 may include one or more openings 59 in the various surfaces for securing the members 24 and 26 to the brackets 32 and 33 using one or more screws, etc.

As depicted in FIGS. 12A-12B the latch bracket 33 may integrate a cable receiving portion 60 of the truss cable connector 30 to which the truss cable 28 may be connected. For example, a cable receiving portion 60 may include one or more openings 59 through which secured the truss cable 28 may be secured. Two openings 59 are depicted in FIGS. 12A-12B, but the skilled artisan may vary the number of openings 59 or design of the receiving portion 60 to achieve various structural and aesthetic objectives.

Figure 13A:
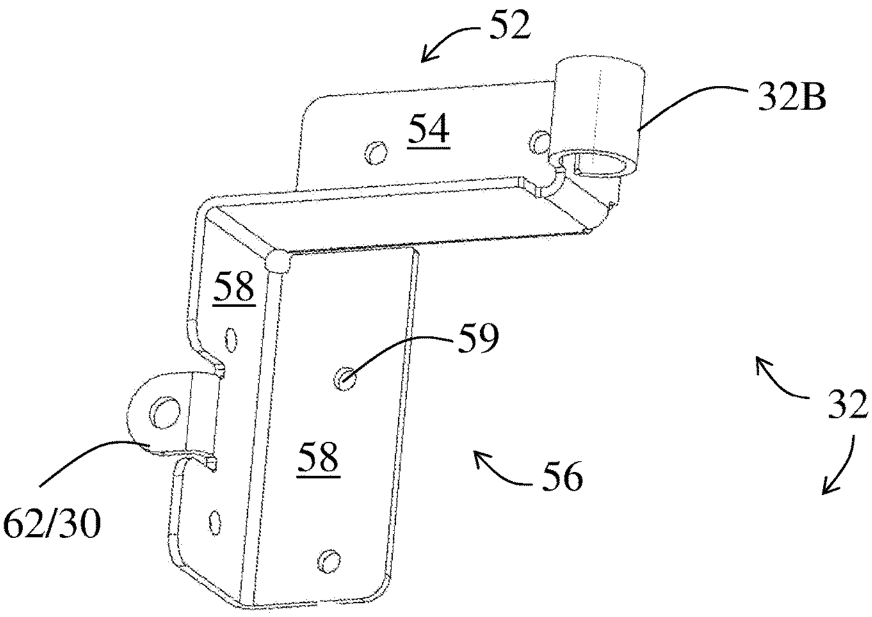
FIGS. 13A-13B show perspective views of exemplary hinge brackets.
Figure 13B:
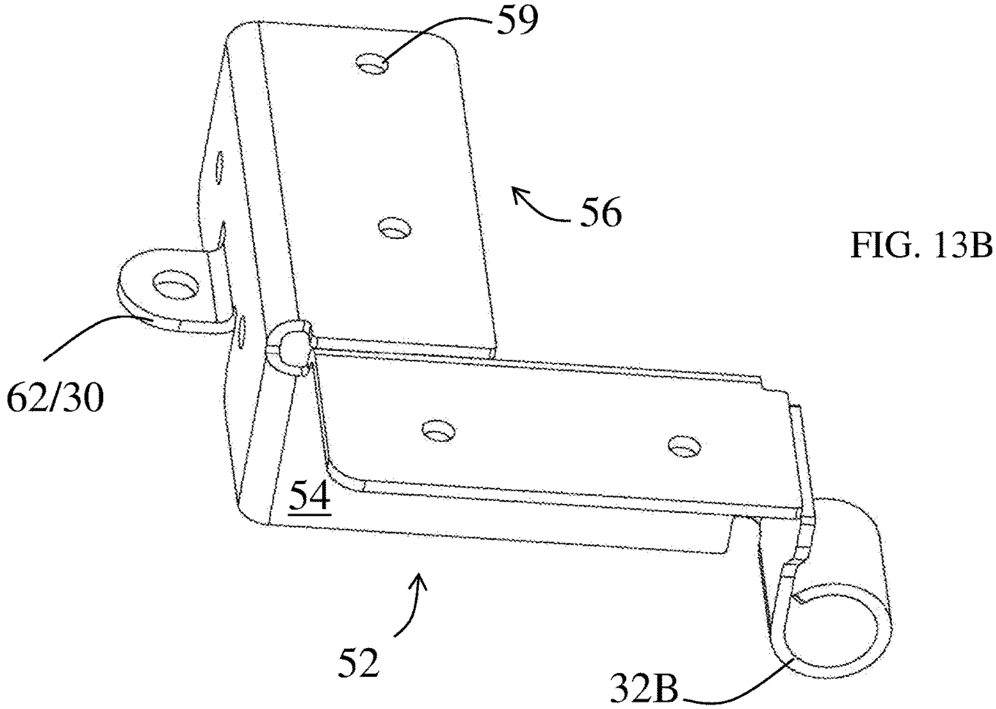

FIGS. 13A-13B depicts embodiments of exemplary hinge brackets 32 that may an integrated include cable connector portion 62 of the truss cable connector 30, such as an open or closed loop to connect to an open or closed loop portion of the truss cable connector 30 positioned on the truss cable 28. It will be appreciated by the skilled artisan that the truss cable receiving portion 60 and cable connector portion 62 may be used interchangeably between the brackets 32 and 33 in various combinations and with other connectors 30.

In application, an installer of the gate 10 may have the gate 10 at an installation site and measure an opening in which the gate 10 will be installed. The installer will cut horizontal members 24, vertical members, and/or diagonal members, as needed, that are not already the correct size for the opening to the proper size. The members will be attached to the brackets 32 and 33. The post hinge bracket 46 will be attached to the post 44 and the post hinge post 46B will be inserted into post hinge bracket slot 32B, or vice versa, and the latch 36 will be attached to one of the vertical members 24. At least one truss cable 28 may be attached between opposing sides of the gate 10 during the installation process.

FIGS. 14A & 14B depict top or bottom plan and perspective views a truss bracket adjustment tool 70 that may be used during the installation, adjustment, resizing, and repair of the truss cable 28. The tool 70 has a first portion 70A that include a generally closed end wrench for turning a collet head 38A and includes an opening sufficient to the truss cable 28 to pass through the opening and enable the wrench head to be positioned to tighten or loosen the collet head 38A. In addition, the tool 70 includes a second portion 70B that may be used to tighten or loosen the turnbuckle 40. In various embodiments, the tool 70 and gate assembly hardware may be configured to enable the first portion of the tool 70A to tighten and loosen various nuts and bolts used in the assembly of the gate 10, such as the latch and striker plate.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations. Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set, except where such combination is not possible.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An adjustable gate comprising:

first and second vertical frame sections having opposing ends; a horizontal frame section rotatably connected to each end of the vertical frame sections and rotatable between a generally parallel position and a generally vertical position relative the vertical frame section, the vertical and horizontal frame section forming an adjustable frame for the gate that may be horizontally adjusted;

the horizontal frame section configured to support a horizontal member;

a member bracket attached to each end of the vertical frame sections proximate each end of the vertical frame sections and above the horizontal frame sections to retain and secure a member positioned in the member bracket;

at least two hinge brackets positioned on the vertical frame section configured to attach to a post and enable the adjustable frame to open and close around an axis of the hinge bracket;

first and second truss cable connectors positioned proximate opposing ends of vertical frame section including a turnbuckle and a collet, the collet providing access to an interior portion of one of the vertical frame sections to retain and store at least a length of truss cable;

a truss cable connected between the truss cable connectors, and end of which is disposable through the collet and within the interior portion of one of the vertical frame sections; and, fencing attached to the adjustable gate frame.

2. The gate of claim 1, where, the truss cable connectors include at least one turnbuckle and a collet.

3. The gate of claim 2, further comprising a truss cable adjustment tool having a first portion including a closed-end wrench to tighten and loosen the collet and including an opening to pass the truss cable and a second portion to adjust the turnbuckle.

4. The gate of claim 1, where, one of the truss cable connectors provides access to an interior portion of at least one of the vertical and horizontal frame sections to retain at least a length of truss cable.

5. The gate of claim 1, where, the truss cable connectors are positioned proximate opposing ends of the first and second vertical frame sections.

6. The gate of claim 1, where, one of the truss cable connectors is a collet that provides access to an interior portion of at least one of the vertical and horizontal frame sections to retain at least a length of truss cable.

7. The gate of claim 1, further comprising at least one post hinge bracket configured to connect to a corresponding hinge bracket to enable rotation of the gate around the connection.

8. An adjustable gate assembly comprising:

at least first and second vertical frame sections having opposing ends;

at least first and section horizontal frame sections, connectable to one end of the vertical frame sections, the vertical and horizontal frame section forming an adjustable gate frame that may be horizontally adjusted;

a member bracket attached to at least one of the horizontal and vertical frame proximate each end of the vertical frame sections and configured to retain a member positioned in the member bracket above the horizontal frame;

at least one hinge bracket positionable on the vertical frame section configured to attach to a post and enable the adjustable gate frame to rotate around an axis of the hinge bracket;

first and second truss cable connectors positionable proximate opposing sides of the gate and connectable to at least one of the horizontal and vertical frame sections; and a truss cable having two ends and suitable for connection between the truss cable connectors, and at least one end of which is disposable through at least one the connectors and into the interior portion of one of the vertical and horizontal frame sections.

9. The gate of claim 8, where, one horizontal frame section is rotatably attached to each end of the vertical framing sections to rotate from a generally parallel to a substantially perpendicular position relative to the vertical frame sections.

10. The gate of claim 8, where, the member bracket includes at least one member bracket attached proximate each end of the vertical frame section, where the member bracket is connected to the vertical frame section at each end above the connection of the horizontal frame section to the vertical frame section.

11. The gate of claim 8, where, one of the truss cable connectors provides access to an interior portion of at least one of the vertical and horizontal frame sections to retain at least a length of truss cable.

12. The gate of claim 8, where, the truss cable connectors are positioned proximate opposing ends of the first and second vertical frame sections.

13. The gate of claim 8, where, one of the truss cable connectors is a collet that provides access to an interior portion of at least one of the vertical and horizontal frame sections to retain at least a length of truss cable.

14. The gate of claim 8, further comprising at least one post hinge bracket configured to connect to a corresponding hinge bracket to enable rotation of the gate around the connection.

* * * * *